(12) United States Patent
Datta-Read et al.

(10) Patent No.: US 7,555,442 B1
(45) Date of Patent: Jun. 30, 2009

(54) ESTIMATING BUSINESS TARGETS

(75) Inventors: Piew Datta-Read, Carlsbad, CA (US); James Howard Drew, Boxborough, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 1217 days.

(21) Appl. No.: 10/163,983

(22) Filed: Jun. 6, 2002

Related U.S. Application Data (60) Provisional application No. 60/298,271, filed on Jun. 14, 2001.

(51) Int. Cl.
    *G06F 17/60* (2006.01)
(52) U.S. Cl. ............................................ 705/10; 705/7
(58) Field of Classification Search .................. 705/7, 705/10
    See application file for complete search history.

(56) References Cited

U.S. PATENT DOCUMENTS

| | | | |
|---|---|---|---|
| 6,836,773 B2 * | 12/2004 | Tamayo et al. | 707/6 |
| 6,988,092 B1 * | 1/2006 | Tang et al. | 707/1 |
| 2002/0169654 A1 * | 11/2002 | Santos et al. | 705/10 |

OTHER PUBLICATIONS

Datta-Piew et a. "Targeting Customers with Statistical and Data-Mining Techniques" Journal of Service Research, vol. 3, No. 3, Feb. 2001, pp. 205-219.*
Horsky, Dan and Nelson, Paul. "Evaluation of Salesforce Size and Productivity Through Efficient Frontier Benchmarking" Marketing Science, vol. 15, No. 4, 1996, pp. 301-220.*
Sinha, Prabhakant and Zoltners, Andris. "Sales-Force Decision Models: Insights from 25 Years of Implementation" Interfaces 31:3 Part 2 of 2, May-Jun. 2001, pp. S8-S44.*
Post, Theirry and Spronk, Jaap. "Performance benchmarking using interactive data envelopment analysis" European Journal of Operations Research, 115 (1990) 472-487.*
Chou, P. B., Grossman, E., Gunopulos, D., and Kamesam, P. 2000. Identifying prospective customers. In Proceedings of the Sixth ACM SIGKDD international Conference on Knowledge Discovery and Data Mining (Boston, Massachusetts, United States, Aug. 20-23, 2000). KDD '00. ACM, New York, NY, 447-456.*
G Appa, M Yue. (1999). On setting scale efficient targets in DEA. The Journal of the Operational Research Society, 50(1), 60-69. Retrieved Feb. 11, 2009, from ABI/INFORM Global database.*
D. Aha et al.; "Instance-Based Learning Algorithms"; Machine Learning, 6; 1991; pp. 37-66.
P. Bauer; "Recent Developments in the Econometric Estimation of Frontiers"; Journal of Econometrics, 46; 1990; pp. 39-56.

(Continued)

*Primary Examiner*—Romain Jeanty (57) ABSTRACT

A method for generating business targets includes accessing data (300) corresponding to a number of customers. The data includes variables (310-330) associated with each of the customers and an observed value for each of the customers. The observed value for a customer may represent revenue associated with that particular customer. The method also includes identifying a neighborhood that includes a first customer and a number of the other customers. The method further includes calculating a target for each of the customers in the neighborhood, where the target may represent the potential revenue from each of the customers.

16 Claims, 6 Drawing Sheets

OTHER PUBLICATIONS

K. Bennett et al.; "Density-Based Indexing for Approximate Nearest-Neighbor Queries"; Proceedings of the Fifth ACM SIGKDD International Conference of Knowledge Discovery and Data Mining; 1999; pp. 233-243.

B. Everitt et al.; Applied Multivariate Data Analysis; Oxford University Press; 1991; 350 pages.

N. Johnson et al.; Continuous Univariate Distributions; vol. 1; Second Edition; 1994; 772 pages.

J. MacQueen; "Some Methods for Classification and Analysis of Multivariate Observations"; Proceedings of the Fifth Berkeley Symposium on Mathematical Statistics and Probability; 1967; pp. 281-297.

P. Mahalanobis; "On the Generalized Distance in Statistics"; Proceedings of the National Institute of Science; vol. 2, No. 1; Apr. 15, 1936; pp. 49-55.

S. Maneewongvatana et al.; "Analysis of Approximate Nearest Neighbor Searching with Clustered Point Sets"; ALENEX 99; 1999; pp. 1-20.

D. Mani et al.; "Statistics and Data Mining Techniques for Lifetime Value Modeling"; Proceedings of the Fifth International Conference on Knowledge Discovery and Data Mining; 1999; pp. 94-103.

L. Seiford et al.; "Recent Developments in DEA: The Mathematical Programming Approach to Frontier Analysis"; Journal of Econometrics 46; 1990; pp. 7-38.

C. Stanfill et al.; "Toward Memory-Based Reasoning"; Communications of the ACM; vol. 29, No. 12; Dec. 1986; pp. 1213-1228.

D. Wilson et al.; "Improved Heterogeneous Distance Functions"; Journal of Artificial Intelligence Research 6; 1997; pp. 1-34.

* cited by examiner

ESTIMATING BUSINESS TARGETS

RELATED APPLICATION

This application claims priority under 35 U.S.C. § 119 based on U.S. Provisional Application No. 60/298,271 filed Jun. 14, 2001, the disclosure of which is incorporated herein by reference.

BACKGROUND OF THE INVENTION

1. Field of the Invention

The present invention relates generally to business performance targets and, more particularly, to generating revenue targets or other business performance targets.

2. Description of Related Art

Companies typically estimate expected revenues or generate revenue targets based on a number of factors. For example, one factor associated with estimating expected revenues is determining how much a customer is willing to spend for a particular product or service. The accuracy of these revenue expectations can have significant implications. For example, a company may alter its operating procedures and/or staffing level based on whether it meets its revenue expectation.

In practice, these revenue expectations are often derived in an ad hoc manner. For example, sales targets for a regional business division or sales targets to individual customers are typically set according to past performance or financial goals. Such sales targets, therefore, may reflect poor business or selling practices or may neglect intrinsic capabilities.

One conventional method used to estimate customer sales potential is regression analysis. Regression analysis generally estimates an average (or in some manifestations, an upper percentile) target. A problem with this approach is that the target, by definition, is not a maximal potential. Regression analysis also uses some pre-specified functional form and error structure to be applied to all customers at once. Such an approach is typically too restrictive for all different types of customers.

Other conventional methods used to estimate maximal or minimal targets are data envelopment analysis (DEA) and frontier analysis. In DEA analysis, the maximal target is described by $\phi_i = g(x_i)$ where $\phi_i$ is the target for $x_i$, a vector for the ith observation. In DEA, the task is to find a surface that exceeds or "envelopes" each observation. The estimated target is set to the maximum (or minimum) from the observed targets. One drawback with this approach is that it is sensitive to errors since it assumes that all observed targets define the possible space. As such, DEA is sensitive to outliers (i.e., observations that are far outside the other observations) and often results in unrealistic target values.

In frontier analysis, the target is described by $\phi_i = g(x_i) + \epsilon_i$, where $\epsilon_i$ is a non-negative error term. This sets the target above its observed performance. One drawback with this approach is the requirement of a model for "g" and for the error term. Pre-specifying the functional form and the error term using some artificial mathematical model, e.g., linear, quadratic, Cobb-Douglass function, translog, etc. typically results in inadequate target values. In other words, relationships in the real world are not typically linear, quadratic etc. Therefore, frontier analysis usually generates target values that are not usable in real world scenarios.

Therefore, a need exists for systems and methods that enable a company to generate usable business performance targets.

SUMMARY OF THE INVENTION

Systems and methods consistent with the present invention address these and other needs by first identifying similar entities using nearest neighbor methodology. These similar entities constitute a neighborhood for each specified entity. Frontiers or targets for each entity may then be established based on its particular neighborhood.

In accordance with the principles of the invention as embodied and broadly described herein, a method is provided that includes accessing data corresponding to a number of entities. The data includes variables associated with each of the entities and each of the entities has a corresponding observed value representing a performance level. The method also includes identifying a neighborhood including a first one of the entities and other ones of the entities. The method further includes calculating at least one of a maximal and minimal target for the neighborhood, where the target is associated with the performance level.

In another implementation consistent with the present invention, a computer-readable medium having stored sequences of instructions is provided. The instructions cause a processor to access data corresponding to a number of entities, where the data includes an observed value for each of the entities. The instructions also cause the processor to identify a neighborhood including a first entity and at least one other entity and calculate at least one of a maximal and minimal target for the neighborhood, where the target is associated with business revenue.

In still another implementation consistent with the present invention, a method for generating a business target includes accessing a database that includes information on a number of customers, where the information includes data associated with each customer's business and data representing a past performance value associated with each customer. The method also includes identifying a neighborhood including the first customer and at least one other customer. The method further includes calculating a target for the neighborhood, where the target is associated with a business performance level.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention use a distance function to identify neighborhoods populated with closely related entities. After identifying the neighborhood, a target for each entity in the neighborhood may be determined. The target may be then be used to identify under marketed customers for targeted upselling and increased sales attention. The target may also be used as an incentive for a sales person to attempt to increase customers' spending.

Exemplary System

Figure 1:
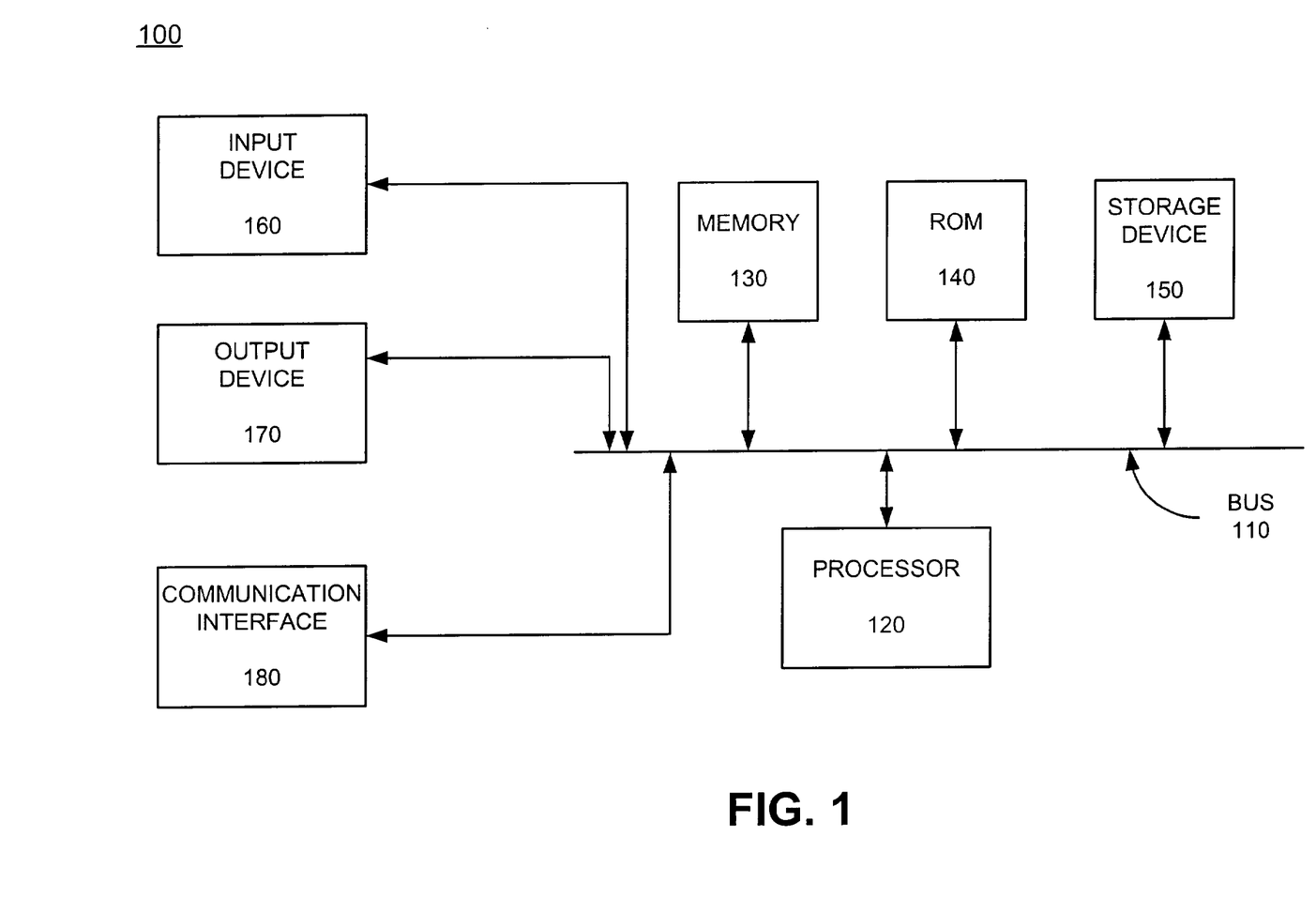
FIG. 1 is a diagram of an exemplary system in which methods and systems consistent with the present invention may be implemented.

FIG. 1 illustrates an exemplary system in which methods and systems consistent with the present invention may be implemented. System 100 includes a bus 110, a processor 120, a memory 130, a read only memory (ROM) 140, a storage device 150, an input device 160, an output device 170, and a communication interface 180. The bus 110 permits communication among the components of system 100.

The processor 120 may include any type of conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. The ROM 140 may include a conventional ROM device or another type of static storage device that stores static information and instructions for processor 120. The storage device 150 may include any type of magnetic or optical recording medium and its corresponding drive, such as a magnetic disk or optical disk and its corresponding disk drive.

The input device 160 may include one or more conventional mechanisms that permit a user to input information to the system 100, such a keyboard, a mouse, a pen, a biometric mechanism, such as a voice recognition device, etc. The output device 170 may include one or more conventional mechanisms that output information to the user, including a display, a printer, one or more speakers, etc. The communication interface 180 may include any transceiver-like mechanism that enables system 100 to communicate via a network. For example, the communication interface 180 may include a modem or an Ethernet interface for communicating via a local area network (LAN). Alternatively, the communication interface 180 may include other mechanisms for communicating with other devices and/or systems.

System 100, consistent with the present invention, defines neighborhoods of similar entities using nearest neighbor methodology and estimates frontiers (i.e., targets) for each entity from its neighborhood. System 100 performs such functions in response to processor 120 executing sequences of instructions contained in a computer-readable medium, such as memory 130. A computer-readable medium may include one or more memory devices and/or carrier waves. Such instructions may be read into memory 130 from another computer-readable medium, such as a data storage device 150, or from a separate device via communication interface 180.

Execution of the sequences of instructions contained in memory 130 causes processor 120 to perform certain acts that will be described hereafter. In alternative embodiments, hardwired circuitry may be used in place of or in combination with software instructions to implement the present invention. In still other alternatives, various acts may be performed manually, without the use of system 100. Thus, the present invention is not limited to any specific combination of hardware circuitry and software.

Exemplary Processing

Figure 2:
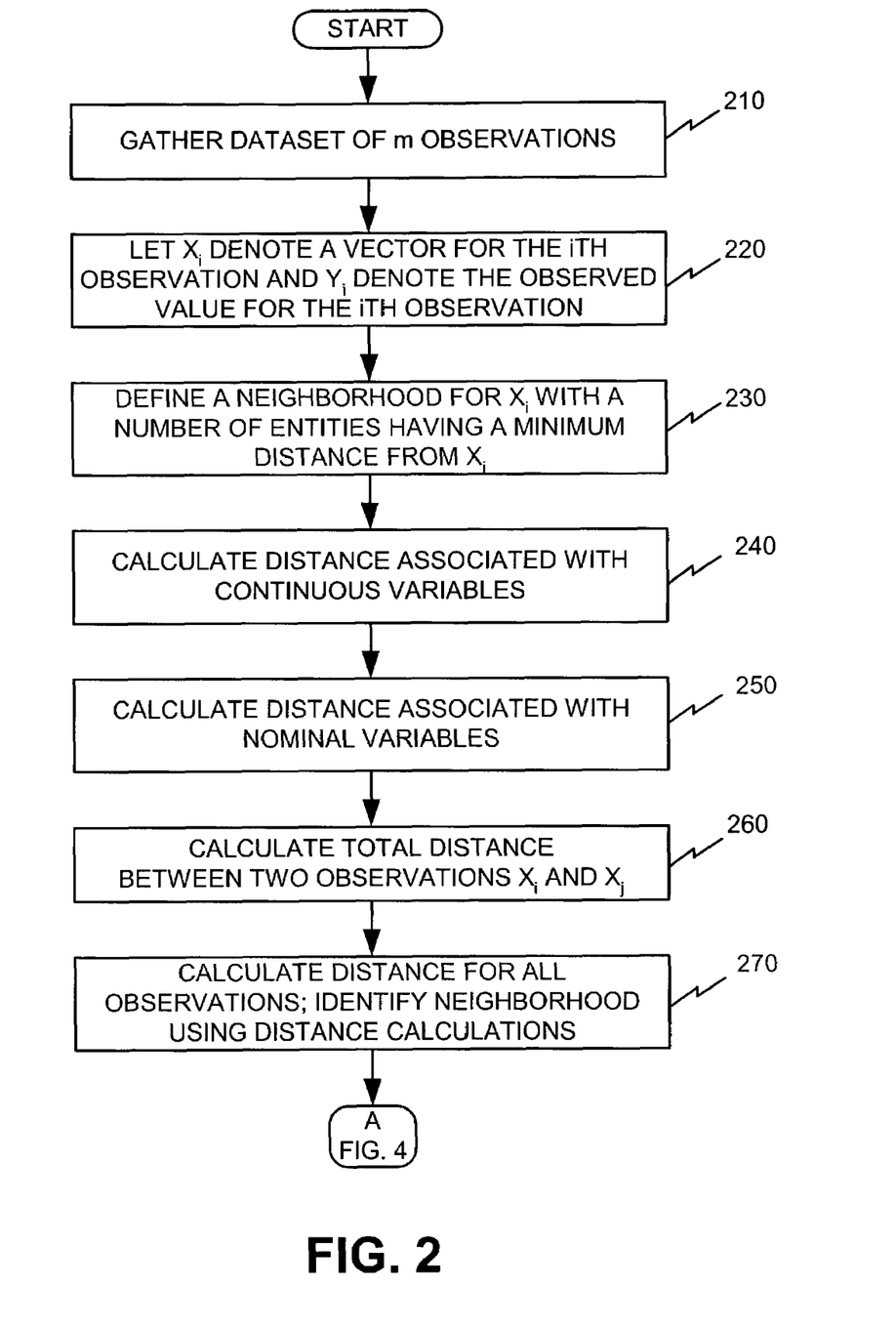
FIG. 2 is a flow diagram illustrating exemplary processing associated with defining neighborhoods.

FIG. 2 is a flow diagram illustrating processing associated with defining neighborhoods in an exemplary implementation consistent with the present invention. Processing may begin by gathering a dataset of m observations (act 210). The m observations may represent any particular set of observations for which a user wishes to establish a maximal or minimal target. For example, the m observations may represent various businesses/entities that advertise in a local telephone company's yellow pages directory. The description below uses the example of dentists that advertise in the yellow pages directory, where m represents the number of dentists. In this example, the local telephone company publishing the yellow pages directory may wish to establish targets for how much each dentist should spend on advertising in the yellow pages, as described in more detail below.

In an exemplary implementation of the present invention, system 100 (FIG. 1) may store information about the dentists that advertise in the yellow pages. For example, storage device 150 may include a database that stores information regarding dentists and other entities that advertise in the yellow pages.

Figure 3:
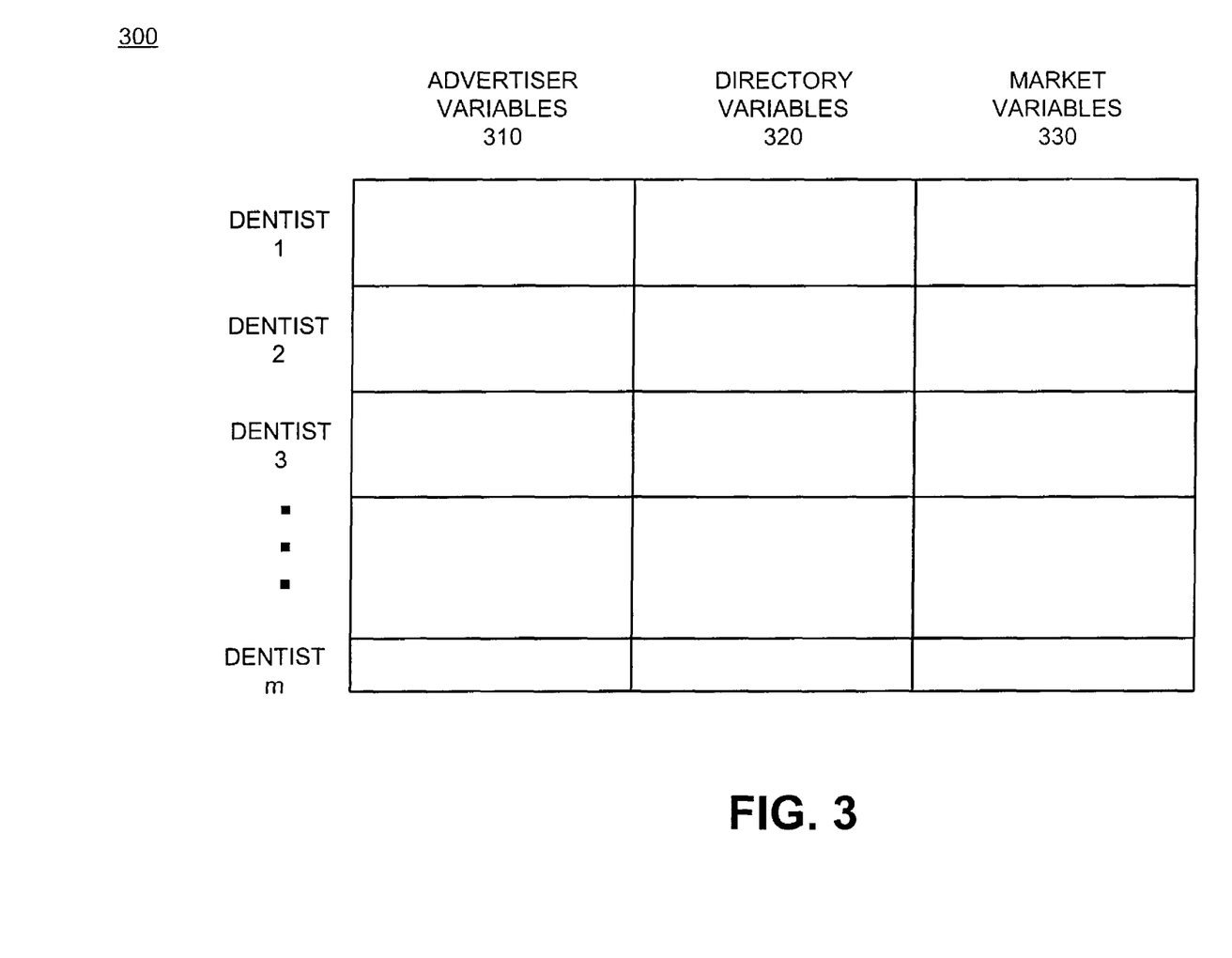
FIG. 3 illustrates a portion of an exemplary database consistent with the present invention.

FIG. 3 illustrates a portion of an exemplary database 300 that may be stored, for example, in storage device 150. Database 300 may include data associated with the various listings in the yellow pages directory. Each data listing may include information particular to the type of listing. For example, the data associated with dentists may include three or more categories of data, including: advertiser variables 310, directory variables 320 and market variables 330.

The advertiser variables 310 may include information such as the number of employees that the dentist has, the amount of business income the dentist takes in, whether the dentist's practice is local or national, the amount that the dentist spends on yellow pages advertising and the manner in which the advertiser was marketed to by the yellow pages publisher (e.g., telephone, Internet, in-person, etc). The directory variables 320 may include information such as the distribution size of the yellow pages directory, a competitive index relating to the competition from other directories, directory penetration in terms of the number of households that receive the directory and unit pricing for advertisements in the directory. The market variables 330 may include median household income in the area where the directory is distributed, total number of businesses in the directory, number of dentists in the directory, distribution area of the directory, penetration of the directory heading and an estimated market growth rate for the area and/or for the particular directory heading. It should be understood that the variables described in database 300 are exemplary and additional/different variables may be used in other implementations of the present invention based on the particular entities involved. It should also be understood that some of these variables may be estimated if the actual values are not known or are not readily available.

Processor 120 may retrieve the dataset of m observations from database 300. As described above, database 300 may be stored in storage device 150. Alternatively, database 300 may be stored external to system 100 and may be accessed via communication interface 180. In still other alternatives, the dataset of m observations may be input manually to system 100 via input device 160.

In any event, after the dataset of m observations is obtained, let $x_i$ denote a vector of values associated with ith observation and $y_i$ denote the variable containing its observed value (act 220). For example, if $x_i$ represents a particular dentist, then $y_i$ may represent the advertising revenue that the local telephone company received from that dentist for his/her yellow pages ad. Next, the process defines a neighborhood $n_i$ to be the neighborhood for $x_i$ where $n_i$ is a set of observations $\{x_i, x_j, \ldots\}$ such that $n_i$ contains those entities that have a minimum distance from $x_i$ (act 230). Each observation, therefore, will be associated with a specific neighborhood containing its most similar observations. In an exemplary implementation of the present invention, the neighborhood $n_i$ may be set to include a relatively small number of observations, such as five or less (e.g., four observations). In other implementations, the neighborhood may include a larger number of observations (e.g., 100 or more), based on the particular entities involved and the user's requirements. It has been found, however, that defining a smaller neighborhood, such as a neighborhood with four observations/entities, may result in more precise data for estimating purposes.

In each case, a similarity or distance function between observations may be used to establish the neighborhoods. The domain associated with the observations may be defined by both continuous and nominal variables. For example, a continuous variable may be the amount of income that the dentist's practice received during a particular year. A nominal variable may include the location of the dentist or the relation of the dentist to the yellow pages organization. For example, the dentist may have his/her office in an area considered to be "local" to the telephone company publishing the yellow pages directory. Alternatively, the dentist may be in an area considered to be "foreign" to the local telephone company (i.e., outside the vicinity of the company publishing the directory).

As described above, the domain for dentists may be defined by both continuous and nominal variables. In this case, processes consistent with the present invention define the distance between observations using a separate function for each type of variable and then combine the results. For example, the distance for the continuous variable j between two observations $x_i$ and $x_j$ may be calculated using a weighted Minkowski equation, such as that given by equation (1) below (act 240).

$$C(x_i, x_j) = \left[ \sum_{q \in continuous} [|x_{iq} - x_{jq}|w_q]^r \right]^{1/r} \quad \text{Eq. (1)}$$

where $x_{iq}$ denotes the value of the qth variable for $x_i$, $x_{jq}$ denotes the value of the qth variable for $x_j$, $w_q$ denotes the weight for the qth variable, and r is set to some value depending on the variable transformations applied. For example, r may be set to either 1 or 2.

The weighting for each variable may require knowledge of the particular domain. For example, the amount of income that the dentist's practice receives annually may be weighted more heavily than other factors, such as market growth, since it would be expected that the dentist's income would strongly influence how much a dentist would be willing to spend on advertising. Therefore, in some implementations of the present invention, the weights for many of the directory variables 320 and market variables 330 may be lower than the weights for many of the advertiser variables 310. Various techniques, such as regression analysis, may also be used to estimate each variable's relative contribution to the amount a particular dentist spends on yellow pages advertising. In still other implementations, the weighting may be the same for each variable.

In addition, since each of the continuous variables may have different magnitudes and distributions, implementations consistent with the present invention may standardize or normalize the continuous variables to allow better control of the contribution of each variable to the distance calculation. A particular continuous variable may be transformed by subtracting its mean over all observations and then dividing by some measure of its variability. Other transformation may also be used. For example, the continuous variables may be transformed by a natural log function prior to calculating the distance in equation (1) above.

In any event, after determining the distance associated with each of the continuous variables, the process calculates the distance for the nominal variables (act 250). In an exemplary implementation, the process uses a weighted distance equation, such as that given by equation (2) below.

$$N(x_i, x_j) = \left[ \sum_{q \in nominal} \left\{ \begin{array}{l} 0, x_{iq} = x_{jq} \\ w_q^r, x_{iq} \neq x_{jq} \end{array} \right\} \right]^{1/r} \quad \text{Eq. (2)}$$

where $x_{iq}$ denotes the value of the qth variable for $x_i$, $x_{jq}$ denotes the value of the qth variable for $x_j$, $w_q$ denotes the weight for the qth variable, and r is set to some value depending on the variable transformations applied. For example, similar to the description regarding the continuous variables, r may be set to either 1 or 2.

In addition, similar to the discussion of weighting with respect to equation (1), various techniques, such as regression analysis, may be used to estimate each nominal variable's relative contribution to the amount a particular dentist spends on yellow pages advertising. In each case, the weighting for each variable may require knowledge of the particular domain.

The distance D between the two observations $x_i$ and $x_j$ may then be calculated by adding the contributions from the continuous and nominal variables using equation (3) below (act 260).

$$D(x_i, x_j) = N(x_i, x_j) + C(x_i, x_j) \quad \text{Eq. (3)}$$

It should also be understood that other equations associated with calculating a distance between continuous variables and nominal variables may be used in alternative implementations consistent with the present invention. For example, implementations consistent with the present invention may use more complex distance metrics, such as a Mahalanobis metric, to calculate the distance between observations. In each case, the selected distance metric is designed to provide a relatively small neighborhood of entities that are essentially identical, other than the amount they spend on yellow pages advertising.

After calculating the distance D between observations $x_i$ and $x_j$, the process calculates the distance between $x_i$ and each of the other observations in the dataset in a similar manner (act 270). The process then identifies a neighborhood that includes k observations that have the minimum distance D from $x_i$ (act 270). For example, the neighborhood $n_i$ may be defined at act 230 such that associated with each observation $x_i$, there are k−1 other observations that are similar (assuming k=|$n_i$| is the number of observations in $n_i$), where k is equal to four. In this case, using the example of dentists, for each dentist, there may be three (i.e., 4−1) other dentists that are in the same neighborhood.

The computational complexity described above for identifying the nearest neighbors is $O(n^2)$. In an implementation consistent with the present invention, a method for increasing the efficiency of the computation can employ a "short circuit" (i.e., decision logic), such that the computation for the $D(x_i, x_j)$ is stopped if the current distance is greater than that of the smallest distances already found. Other methods of reducing computational complexity via approximate nearest neighbor searches and using more complex data structures, such as kd-trees, or creating specialized database indexes can also be applied in implementations consistent with the present invention. In each case, after identifying a neighborhood $n_i$ of similar observations, the process generates target values for the neighborhood, as described in more detail below.

Figure 4:
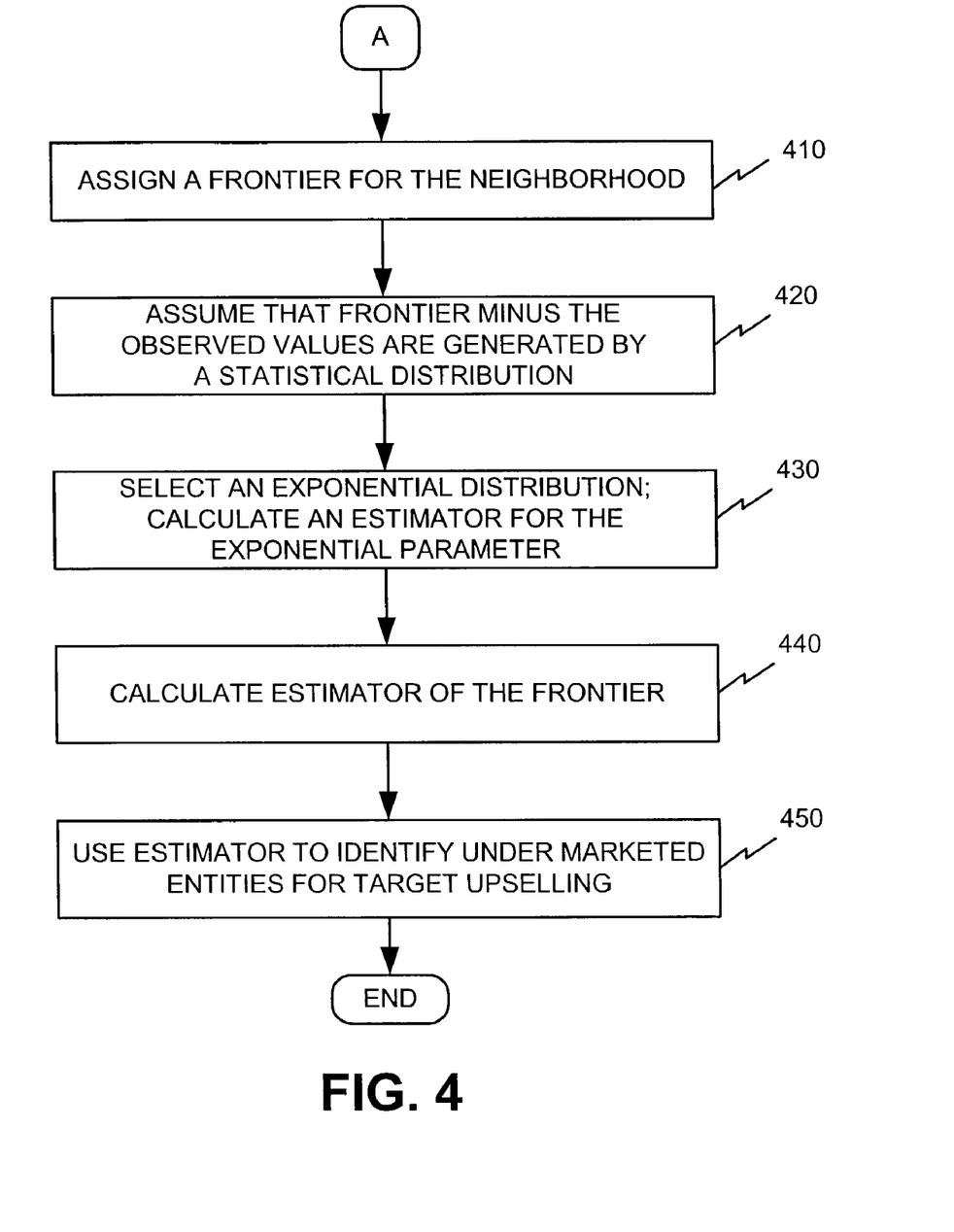
FIG. 4 is a flow diagram illustrating exemplary processing associated with estimating targets.

FIG. 4 illustrates an exemplary process for estimating targets for each observation in a neighborhood. For the neighborhood identified at act 270, assign $\phi_i$ as the frontier (i.e., target) for $n_i$ (act 410). As described previously, $y_1, y_2, \ldots, y_k$ represent the observed measures associated with the entities in the neighborhood. For example, $y_1, y_2, y_3$ and $y_4$ may represent the actual amount spent on yellow pages advertising by four dentists in the same neighborhood $n_i$. Next, assume that $\phi_i - y_{ik} \sim f(\lambda_i)$, where $f(\lambda_i)$ is a statistical distribution taking on only non-negative values (act 420). In other words, assume that the frontier $\phi_i$ minus the observed values for each entity in the neighborhood are generated by a statistical distribution. The distribution, consistent with the present invention, may be considered to be exponential, Gamma, half-Normal or another type of positive distribution used by econometricians.

In an exemplary implementation of the present invention, the process assumes that the distribution is exponential (act 430). In this case, let $y_{i(1)}, y_{i(2)}, \ldots, y_{i(k)}$ define the order statistics for the observed performance, such that $y_{i(1)}$ is the largest observed measure in $n_i$. For example, suppose $y_{i(1)}$ represents the highest amount spent by one of the dentists on advertising in the yellow pages. For the exponential distribution defined by $\phi_i - y_{ik}$, two natural estimators that may be used to estimate the frontier are the maximum likelihood estimator and a linear unbiased estimator. The maximum likelihood estimator of the frontier $\phi_i$ is $y_{i(1)}$. In this case, the target frontier would be set at the largest observed value in that neighborhood. From a business viewpoint, this may be undesirable since the business performance goal would require no increase over the largest observed value (i.e., the business performance is set to be at the frontier). Therefore, an exemplary implementation of the present invention calculates an unbiased estimator of the exponential parameter $\lambda_i$ (act 430). For example, the estimator of exponential parameter, i.e., $\hat{\lambda}_i$, may be calculated using equation (4) below.

$$\hat{\lambda}_i = \frac{1}{k-1} \sum_{j=1}^{k-1} (k-j)(y_{i(j+1)} - y_{i(j)}) \qquad \text{Eq. (4)}$$

The estimator of the frontier, $\hat{\phi}_i$, may then be calculated using equations (5) and (6) below (act 440).

$$\hat{\phi}_i = y_{i(1)} + \frac{\hat{\lambda}_i}{k} \qquad \text{Eq. (5)}$$

$$\hat{\phi}_i = y_{i(k)} + \frac{\hat{\lambda}_i}{k} \qquad \text{Eq. (6)}$$

Equation (5) above represents the maximum target and equation (6) represents the minimum target for each observation $x_i$, where $k$ is equal to the number of observations in the neighborhood. For some measures of performance, the maximum target would be used and for others, the minimum target would be more appropriate. For example, the maximum target might by selected for the advertising amount spent by a dentist advertising in the yellow pages. The minimum target might be selected for the company's cost of soliciting an advertiser.

After generating the estimator for the frontier, the estimator may be used to set performance goals for the process under scrutiny. In a marketing context, the frontier estimators might be used to set sales goals to identify under marketed customers for targeted upselling (act 450). For example, a sales person may use the estimator of the frontier to attempt to persuade a customer, such as a dentist, to increase the amount of yellow pages advertising he/she buys.

Calculating the estimated frontier, as described above, is an unsupervised task, i.e., the actual frontier or maximum performance level is unknown. The observed performance level, however, may represent an indirect measure of this unknown maximum. As described in the example above, the observed revenue variable is not used in any form for finding neighborhoods, but may be used to compare neighborhoods for verification purposes, as described in more detail below.

Gaining Insight into Advertiser Revenue

After determining the maximal frontier for a number of neighborhoods, implementations consistent with the present invention may use a heuristic approach for comparing various neighborhoods to determine whether the methodology used to generate the neighborhoods and their respective frontiers is reasonable. One way of assessing the reasonableness of the estimated frontiers is by summarizing its estimations as a simple statistical model or a small set of decision rules. An exemplary process for comparing neighborhoods consistent with the present invention generates a value $E(x_i)$, the ratio of $y_i$ to the estimated target $\hat{\phi}_i$, using equation (7) below.

$$E(x_i) = \begin{cases} |n_i| > 1, \ (y_i/\hat{\phi}_i) \\ |n_i| = 1, \text{ undefined} \\ \hat{\phi}_i = 0, \text{ undefined} \end{cases} \qquad \text{Eq. (7)}$$

In this case, if the maximal frontier is considered (equation 5), $E(x_i)$ will range from 0 to 1 and will illustrate the proportion of the target attained. For example, if $E(x_i)$ is equal to 0.5, this means that a particular entity (e.g., a dentist) is spending 50% of the target amount for entities in that dentist's neighborhood. If the minimal frontier is considered, then $E(x_i) \geq 1$ and $E(x_i)$ will show the number of times the observed value is larger than the minimum. The distribution of $E(x_i)$ will vary depending on the estimation method and the distribution of the target.

Figure 5:
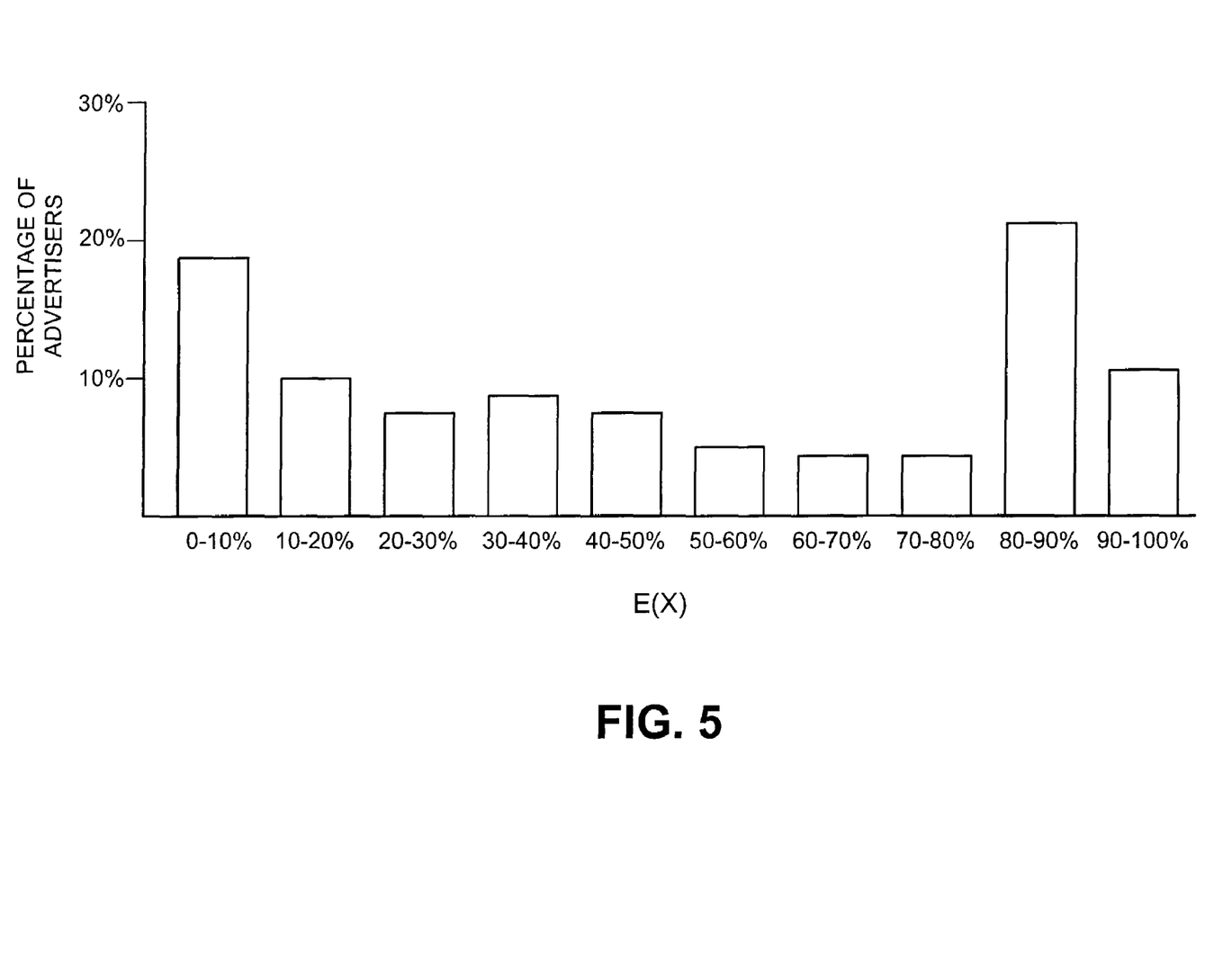
FIG. 5 illustrates an exemplary distribution associated with a number of entities depicting the ratio of an observed value to a target value.

After determining $E(x_i)$ for a number of different entities in different neighborhoods, the distribution of $E(x)$ may provide insight into advertiser revenue. FIG. 5 schematically illustrates the distribution of E(x) based on a random sample of 500 advertisers in the yellow pages directory. The x-axis shows E(x) grouped according to decile and the y-axis shows the percentage of the advertisers falling into each decile.

In the exemplary implementation illustrated in FIG. 5, the neighborhoods have 4 observations ($x_i$ and three neighbors). Therefore, $x_i$ has a 25% chance of having the largest revenue. Referring to FIG. 5, the $\hat{\phi}_i$ estimator distributes the entities having the largest revenue throughout the 80-100% range on the x-axis. The majority of the advertisers, however, are located between 0% and 80%. This may indicate that the majority of advertisers believe that purchasing the minimum ad is sufficient. Alternatively, this may indicate that the majority of advertisers have figured out how to advantageously use discount programs offered by the yellow pages publisher to reduce the cost of their ads.

Figure 6:
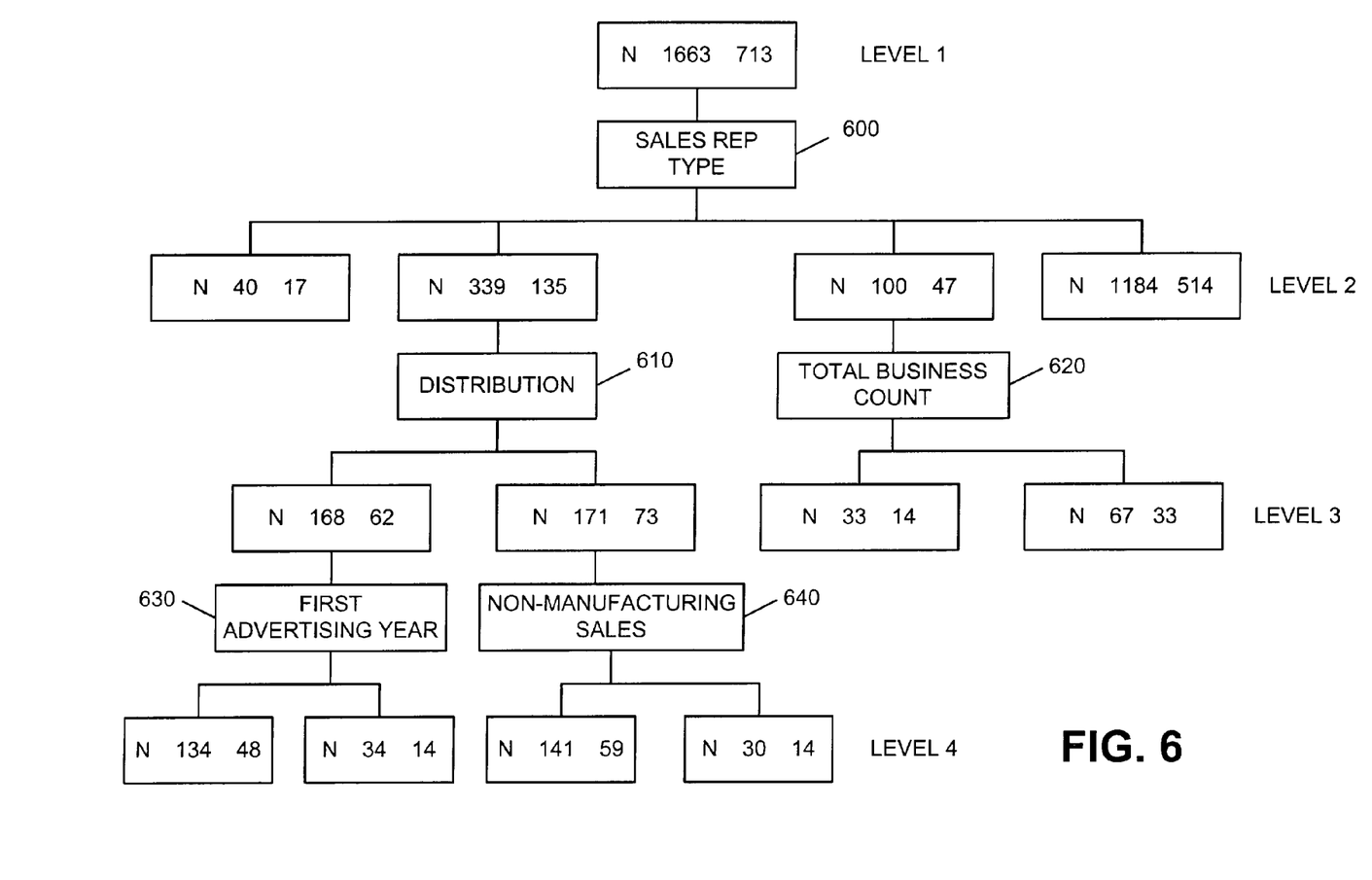
FIG. 6 is an exemplary decision tree associated with a random sample of entities.

In a further effort to better understand the characteristics of advertisers with low spending compared to their neighbors, processes consistent with the present invention may use a decision tree to attempt to predict how the difference between the revenue of $x_i$ and its estimated maximum revenue (i.e., $\hat{\phi}_i - x_i$) relates to the underlying variables associated with the entities.

FIG. 6 schematically depicts a portion of a decision tree predicting the difference between the revenue of $x_i$ and its estimated maximum revenue (i.e., $\hat{\phi}_i - x_i$). Boxes in the decision tree labeled 600-640 indicate the different variables used for defining neighborhoods. As shown in FIG. 6, the top box at level 1 in the decision tree indicates that the test set contains 713 observations and the training set contains 1663 observations. Box 600, labeled sales rep type, then splits the 1663 entities based on the type of sales representatives that handle contacting these entities to purchase yellow pages ads, resulting in the four proportions of entities illustrated at level 2. Boxes 610-640, labeled distribution, total business count, first advertising year and non-manufacturing sales, respectively, further break down the entities. Theoretically, the decision tree may continue until the boxes at the lowest level of the decision tree indicate that every observation is above the threshold or every observation is below the threshold. This would then give the publisher of the yellow pages directory insight into which factor(s) may affect advertiser revenue, in terms of its deviation from its estimated maximum, more than other factors. In the exemplary decision tree in FIG. 6, the sales representative type is the most important factor shown since the split among the entities at level 2 shows greater variances than with respect to the other variables at levels 3 and 4.

Other important factors related to the split may include directory distribution size, market size and annual revenue from the advertiser. Directory characteristics, such as the number of advertisers and ad price, and market characteristics such as business count and household income are also important. If the right most node at level 2 is expanded, ad price, median home value, and market heading penetration can also be used to more finely breakdown advertisers. In each case, the decision tree may help the publisher of the yellow pages directory identify various variables that have a greater impact on the revenue it receives from the advertisers. This information may then be used to change the operating procedures of the sales force.

Since neighborhoods contain advertisers with similar business, directory and market characteristics, sales people in direct contact with advertisers could use the information not only for targeting advertisers for the upsell opportunities described above, but also for identifying product features associated with intra-neighborhood competition. The visual attraction of ads, as the result of increasing the size, adding information, color, etc., from similar businesses may provide the nudge to persuade competitive advertisers to purchase more products.

Systems and methods consistent with the present invention combine nearest neighbor methodology and statistical methods to extend the econometric task of frontier analysis. An advantage of the present invention is that customers having similar characteristics may be identified and the customers with low spending compared to their peers may be identified. Such customers may then be targeted for increased sales focus and upselling, thereby increasing the potential revenue from these sources.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while some or all of the processes described above have been described as being performed on system 100, the present invention may be performed using any computing device. In addition, while series of acts have been described with respect to FIGS. 2 and 4, the order of the acts may be modified in other implementations consistent with the present invention. Moreover, non-dependent acts may be performed in parallel.

In addition, the present invention has also been described with the example of dentists that advertise in the yellow pages, where the business target is advertising revenue for the publisher of the yellow pages. It should be understood that the present invention may be used to set any performance level or business target associated with any types of entities for any business or division of a business.

Lastly, the present invention has been described as using particular equations to identify the neighborhoods and to estimate the frontier. Other statistical methods may also be used in other implementations of the invention. For example, in situations where the dataset is too large or complex, even with complexity reducing measures described above, sampling may be used. For example, the neighborhoods may be identified from a representative sample. The maximum estimates may then be generated using the process described above with respect to FIG. 4. Other efficient data mining methods (e.g. neural networks) may also be used to identify a model that maps sample observations to their estimates. This model can then be applied to the remaining observations for predicting their estimates. These estimates, being constructed from a neural network or decision tree model, are therefore unlikely to be outliers. In other words, nearest neighbor methodology would be used to change the task from an unsupervised task to a supervised task, where other methods can then be applied to generate the estimates.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method to be practiced on a computer for generating usable business revenue performance targets, comprising:
   accessing, by first operation of said computer, data corresponding to a plurality of entities, the data including variables associated with each of the entities and wherein each of the entities has a corresponding observed value representing a performance level;

identifying, by second operation of said computer, an under-marketed customer-revenue neighborhood including a first one of the entities and a number of other ones of the plurality of entities;

calculating, by third operation of said computer, at least one of a maximal usable business revenue performance target and a minimal usable business revenue performance target for the under-marketed customer-revenue neighborhood, the calculated at least one target being associated with the performance level; and outputting, by fourth operation of said computer, via at least one of a display, a printer and a speaker, said at least one of said maximal usable business revenue performance target and said minimal usable business revenue performance target to a user of said usable business revenue performance targets;

wherein the calculating includes selecting an exponential distribution function to represent a distribution of values corresponding to respective differences between the calculated at least one target and the observed values associated with the entities in the neighborhood, and estimating an exponential parameter associated with the exponential distribution; and wherein the calculating at least one of a maximal and minimal target further includes estimating the target using the largest observed value associated with an entity in the neighborhood and the estimate of the exponential parameter.

2. The method of claim 1, wherein the estimating the target includes:

dividing the estimate of the exponential parameter by the number of entities in the neighborhood to obtain a first value, and adding the first value to the largest observed value associated with an entity in the neighborhood, wherein a result of the adding represents the maximal target for the neighborhood.

3. The method of claim 1, wherein the usable business performance target is setting a sales goal and wherein the calculating further comprises calculating a maximal target, the method further comprising:

setting a sales goal using the calculated maximal target.

4. The method of claim 1, wherein the performance level is associated with advertising revenue and the neighborhood comprises four entities.

5. The method of claim 1 wherein the variables include continuous variables and nominal variables and the identifying a neighborhood includes:

calculating a first distance between the first entity and each of the other of the plurality of entities, the first distance being associated with the continuous variables, and calculating a second distance between the first entity and each of the other of the plurality of entities, the second distance being associated with the nominal variables.

6. The method of claim 5, wherein the identifying a neighborhood further includes:

adding the first distance and the second distance to determine a total distance from the first entity to each of the other entities, and selecting a predetermined number of the other entities based on the respective total distances.

7. The method of claim 6, wherein the selecting a predetermined number of the other entities includes:

selecting a predetermined number of entities having the lowest total distance from the first entity.

8. The method of claim 5, wherein the calculating a first distance comprises calculating the first distance using a weighted Minkowski distance function, where at least some of the continuous variables have different weights.

9. The method of claim 8, wherein the calculating a second distance comprises calculating the second distance using a weighted equation, wherein at least some of the nominal variables have different weights.

10. A computer-readable medium having stored thereon a plurality of sequences of instructions which, when executed by a processor, cause said processor to perform a method for generating a usable business revenue performance target, the method comprising:

accessing, by first operation of said processor, data corresponding to a plurality of entities, the data including an observed value for each of the entities;

identifying, by second operation of said processor, an under-marketed customer-revenue neighborhood including a first entity and at least one other entity;

calculating, by third operation of said processor, at least one of a maximal usable business performance target and minimal usable business performance target for the under-marketed customer-revenue neighborhood, the target being associated with business revenue; and outputting, by fourth operation of said computer, via at least one of a display, a printer and a speaker, said at least one of said maximal usable business revenue performance target and said minimal usable business revenue performance target to a user of said usable business revenue performance targets;

wherein when calculating at least one of a maximal and minimal target, the instructions cause said processor to select an exponential distribution function to represent a distribution of values corresponding to respective differences between the target and the observed values associated with the entities in the neighborhood, and calculate an unbiased estimator of an exponential parameter associated with the exponential distribution, said exponential distribution function selection and said unbiased estimator calculation being used in said calculating said at least one of said maximal and said minimal target; and wherein when calculating said at least one of said maximal and said minimal target, the instructions further cause the processor to calculate an estimator of the target using the largest observed value associated with an entity in the neighborhood and the calculated unbiased estimator.

11. The computer-readable medium of claim 10, wherein the usable business performance target is a maximal target usable for setting a sales goal and wherein the instructions further cause the processor to set the sales goal using the maximal target.

12. The computer-readable medium of claim 10, wherein when calculating an estimator of the target, the instructions further cause the processor to:

divide the calculated unbiased estimator by the number of entities in the neighborhood to obtain a first value, and add the first value to the largest observed value associated with an entity in the neighborhood, wherein a result of the adding represents the maximal target for the neighborhood.

13. The computer-readable medium of claim 10 wherein the data includes continuous variables and nominal variables associated with each of the plurality of entities and when identifying a neighborhood, the instructions cause said processor to:

calculate a first distance between the first entity and each of the other entities, the first distance being associated with the continuous variables, and calculate a second distance between the first entity and each of the other entities, the second distance being associated with the nominal variables.

14. The computer-readable medium of claim 13, wherein when identifying a neighborhood, the instructions further cause said processor to:
  add the respective first and second distances to determine a total distance from the first entity to each of the other respective entities, and
  select a predetermined number of the other entities having the lowest total distance from the first entity.

15. The computer-readable medium of claim 13, wherein when calculating a first distance, the instructions cause the processor to calculate the first distance using a first weighted distance equation, where at least some of the continuous variables have different weights.

16. The computer-readable medium of claim 15, wherein when calculating a second distance, the instructions cause the processor to calculate the second distance using a second weighted equation, wherein at least some of the nominal variables have different weights.

* * * * *